(12) United States Patent
Asao et al.

(10) Patent No.: US 10,766,078 B2
(45) Date of Patent: Sep. 8, 2020

(54) WORKPIECE PICKING DEVICE

(71) Applicant: FANUC CORPORATION, Yamanashi (JP)

(72) Inventors: Kyouhei Asao, Yamanashi (JP); Naoki Akagawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/054,083

(22) Filed: Aug. 3, 2018

(65) Prior Publication Data

US 2019/0070673 A1    Mar. 7, 2019

(30) Foreign Application Priority Data

Sep. 5, 2017   (JP) .................... 2017-170130

(51) Int. Cl.
   *B25J 15/08*    (2006.01)
   *B23B 31/20*    (2006.01)

(52) U.S. Cl.
   CPC ............ *B23B 31/205* (2013.01); *B25J 15/08* (2013.01)

(58) Field of Classification Search
   CPC ............ B65H 3/0883; B65H 2801/81; B65H 2701/12; B65G 59/106; B65G 59/062; B65G 2201/0258; B65G 59/06
   USPC ..................................................... 414/795.6
   See application file for complete search history.

(56) References Cited

U.S. PATENT DOCUMENTS

| 4,441,844 A | * | 4/1984 | Miller .................... B65G 59/02 225/103 |
| 4,673,325 A | | 6/1987 | Jago |
| 4,861,227 A | | 8/1989 | Cinotti |
| 5,380,147 A | | 1/1995 | Hess et al. |

(Continued)

FOREIGN PATENT DOCUMENTS

| CN | 86100742 A | 7/1986 |
| EP | 0189969 A1 | 8/1986 |

(Continued)

OTHER PUBLICATIONS

Japanese Decision to Grant a Patent dated Aug. 13, 2019, in connection with corresponding JP Application No. 2017-170130 (5 pgs., including English translation).

(Continued)

*Primary Examiner* — Lynn E Schwenning
(74) *Attorney, Agent, or Firm* — Maier & Maier, PLLC

(57) ABSTRACT

A workpiece picking device configured to pick up plate-like or pillar-shaped workpieces one at a time from the top of the workpieces stacked in the vertical direction, the workpiece picking device including: a chuck including a plurality of gripping claws arranged around the topmost workpiece and configured to grip a side surface of the topmost workpiece, and movable in a vertical direction, and a separator provided inside at least one of the gripping claws, and configured to separate the topmost workpiece gripped by the plurality of gripping claws from the second workpiece, the separator including a pressing part configured to be projectable downwardly from the at least one of the gripping claws toward the second workpiece, and a driving part configured to press the pressing part against the second workpiece by moving the pressing part toward the second workpiece.

9 Claims, 13 Drawing Sheets

(56) References Cited

U.S. PATENT DOCUMENTS

| | | | |
|---|---|---|---|
| 7,048,492 B2* | 5/2006 | Spatafora | B65G 59/023 |
| | | | 414/795.9 |
| 2004/0028519 A1 | 2/2004 | Spatafora et al. | |
| 2009/0088898 A1 | 4/2009 | Nihei et al. | |

FOREIGN PATENT DOCUMENTS

| | | |
|---|---|---|
| EP | 2042278 A2 | 4/2009 |
| GB | 2170481 A | 8/1986 |
| JP | S60-042241 A | 3/1985 |
| JP | S60-142241 U | 9/1985 |
| JP | S64-42888 U | 3/1989 |
| JP | H02-053588 A | 2/1990 |
| JP | H04-361929 A | 12/1992 |
| JP | H05-051145 A | 3/1993 |
| JP | H05-147814 A | 6/1993 |
| JP | H06-171772 A | 6/1994 |
| JP | 2002-127071 A | 5/2002 |
| JP | 2003-165082 A | 6/2003 |
| JP | 2003-312841 A | 11/2003 |
| JP | 2009-82997 A | 4/2009 |
| JP | 2016-023045 A | 2/2016 |
| NZ | 214762 A | 3/1987 |

OTHER PUBLICATIONS

Japanese Search Report dated Jul. 25, 2019, in connection with corresponding JP Application No. 2017-170130 (15 pgs., including English translation).

* cited by examiner

WORKPIECE PICKING DEVICE

CROSS-REFERENCE TO RELATED APPLICATIONS

This application is based on and claims priority to Japanese Patent Application No. 2017-170130 filed on Sep. 5, 2017, the content of which is incorporated herein by reference in its entirety.

TECHNICAL FIELD

The present invention relates to a workpiece picking device for picking out workpieces one at a time from the top of the stacked workpieces.

BACKGROUND ART

Conventionally, workpiece picking devices have been known that pick up workpieces one at a time from the top of the stacked workpieces (for example, see PTL 1 and PTL 2). When the topmost workpiece is lifted by the workpiece picking device, the second workpiece from the top may stick to the topmost workpiece and may be lifted together with the topmost workpiece. In order to overcome such an inconvenience, as a means for separating the second and following workpieces from the first workpiece, the apparatus of PTL 1 includes a workpiece presser, and the apparatus of PTL 2 includes a workpiece separation device.

LITERATURE LIST

{Patent Literature}
{PTL 1}
Japanese Unexamined Patent Application, Publication No. 2003-165082
{PTL 2}
Japanese Unexamined Patent Application, Publication No. Hei 05-051145

SUMMARY OF INVENTION

One aspect of the present disclosure is a workpiece picking device configured to pick up plate-like or pillar-shaped workpieces one at a time from a top of the workpieces stacked in a vertical direction, the workpiece picking device including: a chuck including a plurality of gripping claws arranged around a topmost workpiece, the plurality of gripping claws configured to grip a side surface of the topmost workpiece, the chuck being movable in a vertical direction; and a separator provided inside at least one of the gripping claws, the separator configured to separate the topmost workpiece gripped by the plurality of gripping claws from a second workpiece, the separator including: a pressing part configured to be projectable downwardly from the at least one of the gripping claws toward the second workpiece, and a driving part configured to press the pressing part against the second workpiece by moving the pressing part toward the second workpiece.

DESCRIPTION OF EMBODIMENTS

First Embodiment

Figure 1:
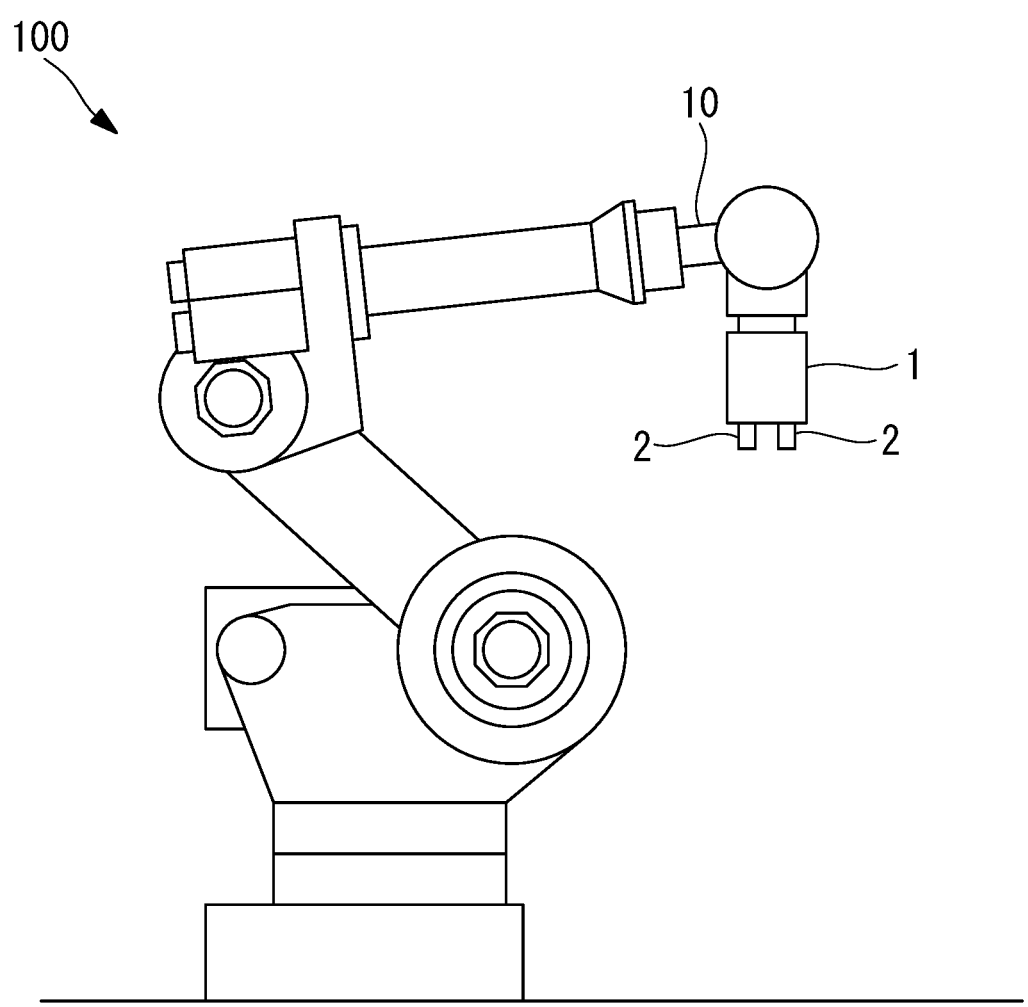
FIG. 1 is a general configuration diagram of a workpiece picking device according to a first embodiment of the present invention.
Figure 2:
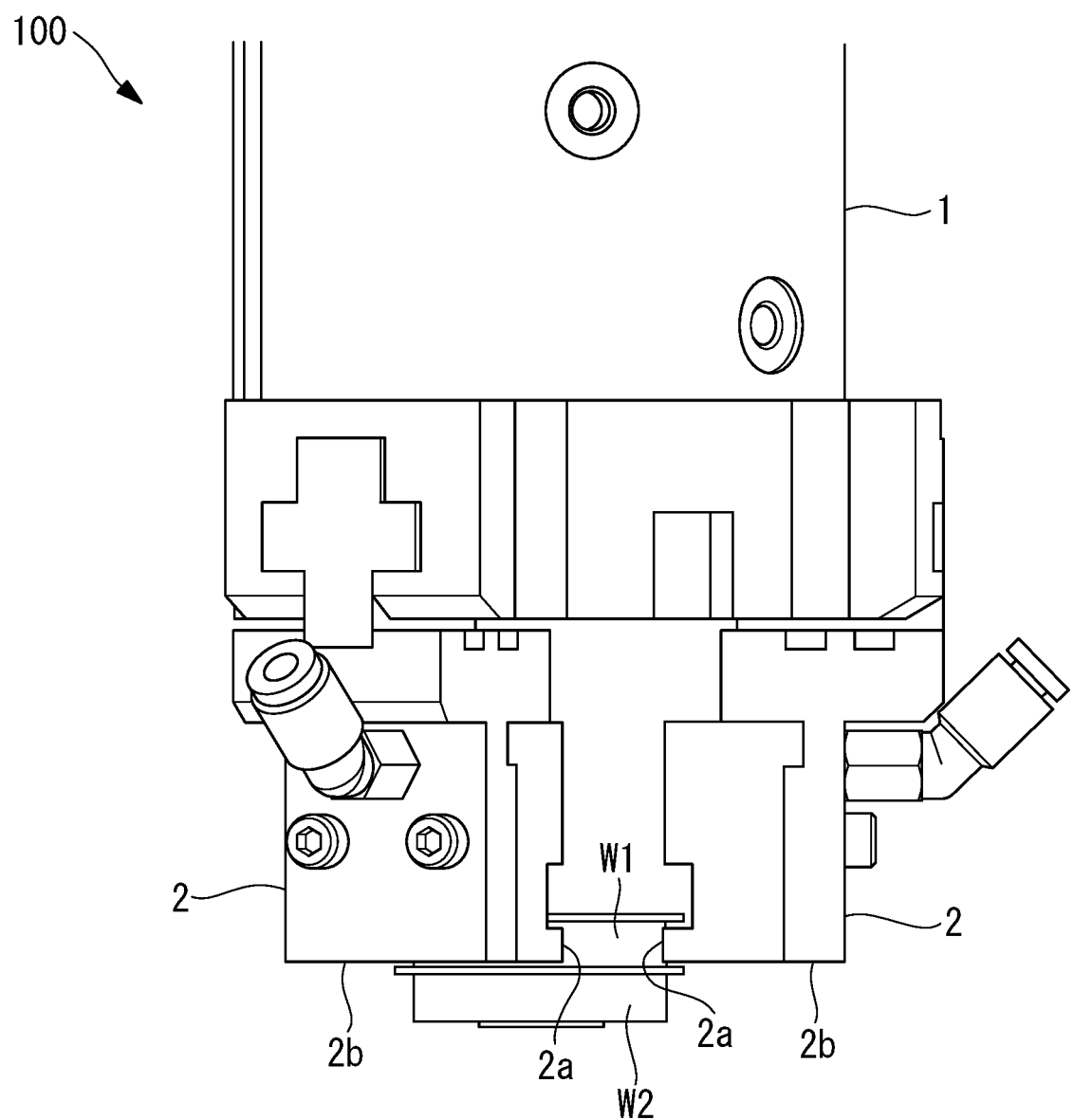
FIG. 2 is a partial external view of the workpiece picking device according to the first embodiment of the present invention.

Referring to FIGS. 1 to 4, a description is given of a workpiece picking device 100 according to a first embodiment of the present invention.

The workpiece picking device 100 according to this embodiment is, for example, a robot for transfer that picks out workpieces W1, W2 . . . , which are stacked in a single stack in a vertical direction after machining, one at a time from the top, and transfers them to a predetermined transfer destination. The stacked workpieces W1, W2 . . . may adhere to each other due to an oil or the like that adhered to a surface at the time of machining. The workpiece picking device 100 is configured so that it can separate and transfer the workpieces W1, W2 . . . one at a time.

Specifically, as shown in FIG. 1 to FIG. 3A to 3D, the workpiece picking device 100 includes a chuck 1 including a plurality of gripping claws 2 for gripping the workpiece W1, and movable up and down in a vertical direction, and a separator 3 built-in inside the gripping claw 2 for separating the topmost workpiece W1 from the second workpiece W2.

The workpiece picking device 100 of this embodiment is applied to disc-like or cylindrical workpieces W1, W2 . . . on top of which a flange F projecting radially outward than a side surface is provided. The workpieces W1, W2 . . . are stacked with the flanges F facing up.

As shown in FIG. 1, the workpiece picking device 100 is an articulated robot including an articulated robot arm 10 that can operate in three-dimensions, and the chuck 1 is provided in a tip part of the robot arm 10. The chuck 1 is movable three-dimensionally by operation of the robot arm 10, i.e., in the horizontal direction, up and down in the vertical direction, and an oblique direction between the upper side of the workpieces W1, W2 . . . and the upper side of a predetermined transfer destination. Instead of the articulated robot, the workpiece picking device 100 may be a SCARA robot or a loader.

The plurality of gripping claws 2 are provided in the lower part of the chuck 1, and they are equally arranged around the central axis X in the vertical direction so that they are arranged around the circumference of the topmost workpiece W1. In this embodiment, the configuration with three gripping claws 2 is assumed, and only two of the three gripping claws 2 are illustrated in the referred drawing.

The three gripping claws 2 are opened and closed by moving in a radial manner with respect to the central axis X, thereby gripping and releasing the workpiece W1. That is, the three gripping claws 2 are closed by simultaneously moving in the direction close to the central axis X, thereby gripping the side surface of the workpiece W1. Additionally, the three gripping claws 2 are opened by simultaneously moving in the direction away from the central axis X, thereby releasing the workpiece W1. A chuck surface 2a of the gripping claw 2 that is arranged inside (on the central-axis X side) and contacts the side surface of the workpiece W1 may be curved around the central axis X so as to extend along the side surface of the workpiece W1.

The separator 3 is provided inside of at least one of the gripping claws 2. As shown in FIG. 3A to 3D, the separator 3 includes a pressing part 4, an air cylinder (driving part) 5 that moves the pressing part 4 up and down in the vertical direction, and an air circuit 6 connected to the air cylinder 5. The pressing part 4 may have a rectangular or circular shape.

The pressing part 4 is arranged inside the gripping claw 2 so as to be able to project vertically downward from a bottom surface 2b of the gripping claw 2. Additionally, the pressing part 4 is arranged near the chuck surface 2a, and when the three gripping claws 2 are gripping the side surface of the workpiece W1, the pressing part 4 is arranged near the side surface of the workpiece W1 such that at least a portion of the pressing part 4 overlaps with the flange F in the vertical direction.

The air cylinder 5 pushes out the pressing part 4 vertically downward from near the chuck surface 2a when compressed air (air) A is supplied from the air circuit 6, and raises the pressing part 4 vertically upward when the air A is discharged via the air circuit 6.

Next, a description is given of the operation of the workpiece picking device 100 configured as described above.

The stacked workpieces W1, W2 . . . are arranged under the chuck 1 such that the center of the workpieces W1, W2 . . . is located vertically downward the center of the three gripping claws 2.

Figure 3A:
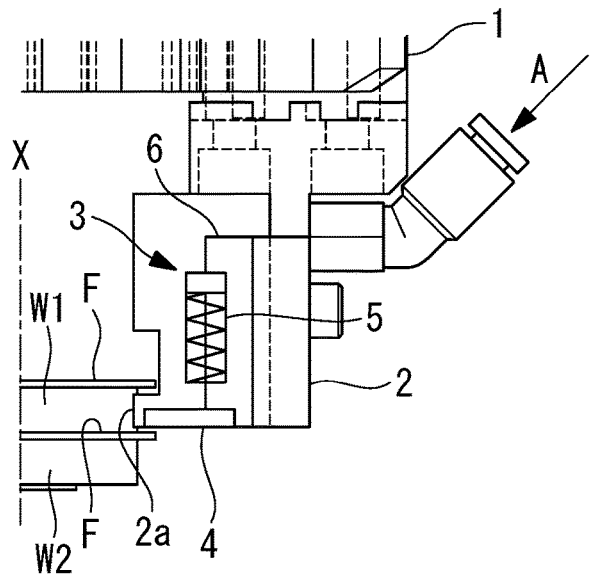
FIG. 3A is a diagram of the internal configuration of a gripping claw and the operation of the workpiece picking device of FIG. 1 illustrating the state where the topmost workpiece is gripped by the gripping claws.

When the operation of the workpiece picking device 100 is started, the chuck 1 is lowered to the position where the three gripping claws 2 surround the topmost workpiece W1, and subsequently, as shown in FIG. 3A, the side surface of the topmost workpiece W1 is gripped by the gripping claws 2 by closing the three gripping claws 2.

Figure 3B:
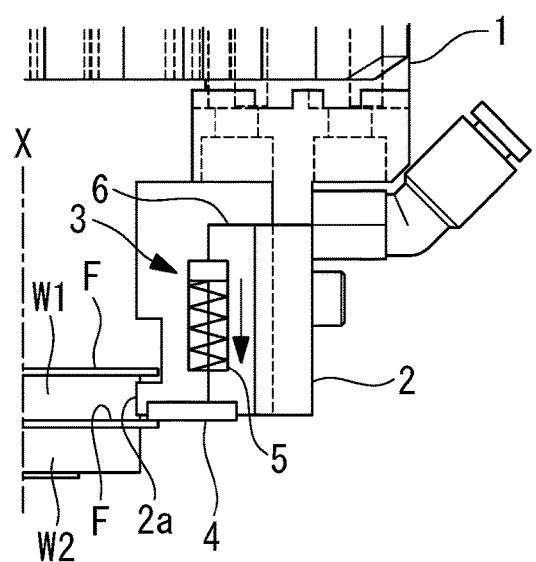
FIG. 3B is a diagram of the internal configuration of a gripping claw and the operation of the workpiece picking device of FIG. 1 illustrating the state where a pressing part is pushed out downward.

Next, as shown in FIG. 3B, the air A is supplied to the air cylinder 5 from the air circuit 6, and the air cylinder 5 pushes out the pressing part 4 vertically downward from near the chuck surface 2a. At this moment, when the workpiece W2 is adhering to the bottom of the workpiece W1, the pressing part 4 is pressed against the flange F of the workpiece W2.

Figure 3C:
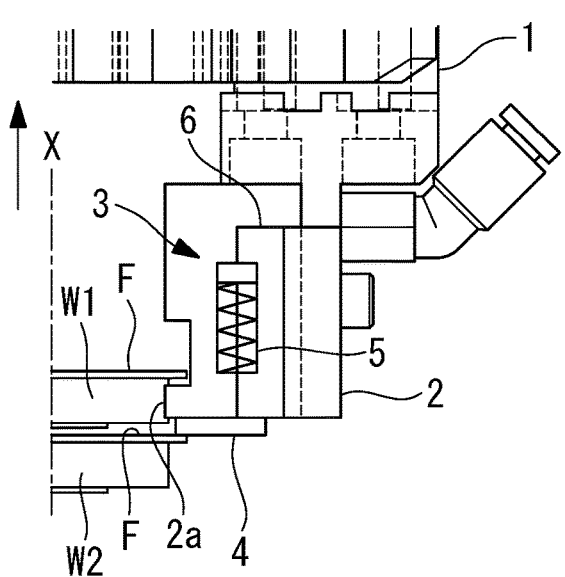
FIG. 3C is a diagram of the internal configuration of a gripping claw and the operation of the workpiece picking device of FIG. 1 illustrating the state where a chuck is raised.

Next, as shown in FIG. 3C, the chuck 1 is raised, and the workpiece W1 is also raised together with the chuck 1. In the process in which the workpiece W1 is raised, the pressing part 4 continues to be pressed against the flange F of the workpiece W2 vertically downward by the air cylinder 5. Accordingly, the workpiece W2 is reliably separated from the workpiece W1 that is raised, and only the workpiece W1 is lifted.

Figure 3D:
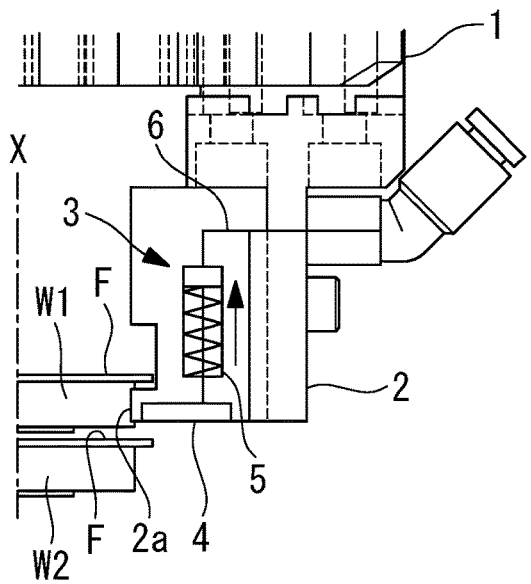
FIG. 3D is a diagram of the internal configuration of a gripping claw and the operation of the workpiece picking device of FIG. 1 illustrating the state where the pressing part is raised.

Next, as shown in FIG. 3D, the air A is discharged from the air cylinder 5 via the air circuit 6, and the air cylinder 5 raises the pressing part 4 to the inside of the gripping claw 2.

Next, the workpiece W1 is transferred above the predetermined transfer destination by the operation of the robot arm 10, and the workpiece W1 is placed on the predetermined transfer destination by opening the three gripping claws 2.

As described above, according to this embodiment, the workpiece picking device 100 is configured such that when the chuck 1 lifts the topmost workpiece W1, the second workpiece W2 is pressed downward by the pressing part 4. Therefore, in the process of lifting the workpiece W1, the workpiece W2 adhering to the bottom of the workpiece W1 can be reliably separated from the workpiece W1, and only the workpiece W1 can be picked up. Additionally, since the separator 3 is provided inside the gripping claw 2, compared with the case where the separator separate from the chuck 1 is provided outside the chuck 1, it is possible to reduce the size and cost of the whole device. Further, in the task of picking up the workpiece W1, the process added with the addition of the separator 3 is only a process of pushing out the pressing part 4. Thus, there is almost no extension of the take out time.

Figure 4:
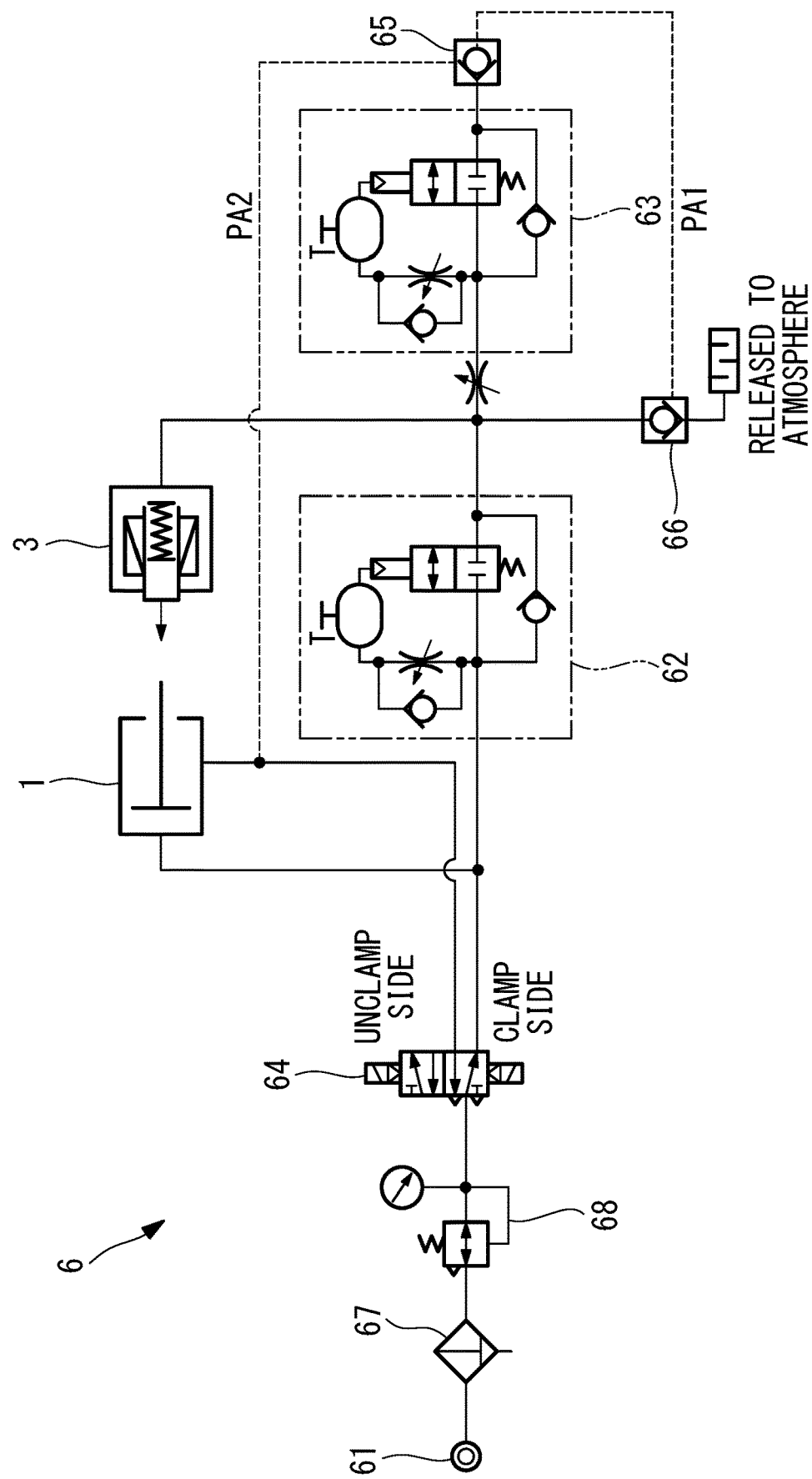
FIG. 4 is a diagram illustrating an example of an air circuit in the workpiece picking device of FIG. 1.

In this embodiment, it is preferable that the air circuit 6 for driving the chuck 1 and the separator 3 is designed such that the separator 3 is operated in conjunction with the closing operation of the gripping claws 2. FIG. 4 illustrates an example of such an air circuit 6.

The air circuit 6 of FIG. 4 includes a single air source 61 to which the chuck 1 and the separator 3 are connected in parallel, and which outputs air (air pressure), and a first air sequence valve (delay valve) 62 that is provided between the air source 61 and the separator 3, and delays the transmission of the air pressure. The reference numeral 63 denotes a second air sequence valve, the reference numeral 64 denotes a switching valve, the reference numerals 65 and 66 denote pilot check valves, the reference numeral 67 denotes an air filter, and the reference numeral 68 denotes an air regulator.

The air circuit 6 configured as described above operates as follows.

In the state where the switching valve 64 is switched to a clamp side, the air is discharged from the air source 61. The discharged air is simultaneously supplied to the chuck 1 and the first air sequence valve 62 via the air filter 67, the air regulator 68, and the switching valve 64.

The chuck 1 to which the air is supplied is moved above the workpieces W1, W2 . . . , is lowered to the position of the topmost workpiece W1, and grips the workpiece W1 with the gripping claws 2.

Then, by supplying the air to the separator 3 later than the chuck 1 by means of the first air sequence valve 62, the operation of the air cylinder 5 of the separator 3 is started, and the pressing part 4 pushed out downward is pressed against the workpiece W2. The timing at which the separator 3 starts the operation is set to, for example, 1 second to 10 seconds after the workpiece W1 is gripped by the gripping claws 2. Then, when the chuck 1 is raised, the workpiece W2 is separated from the workpiece W1, and only the workpiece W1 is lifted.

Next, the pilot check valve 66 is opened by supplying the air to the pilot check valve 66 later than the separator 3 by means of the second air sequence valve 63. As a result, the pressure of the separator 3 is released to the atmosphere, and the air cylinder 5 raises the pressing part 4. The timing at which the pilot check valve 66 operates is set to, for example, 1 second to 10 seconds after the chuck 1 is raised. At this moment, the pressure of a pilot air PA1 is maintained by the pilot check valve 65.

Next, the switching valve 64 is switched to an unclamped side, the chuck 1 is moved above the predetermined transfer destination, and the workpiece W1 is placed on the predetermined transfer destination by opening the gripping claws 2.

Next, the pilot check valve 65 is opened by a pilot air PA2. After the pressure of the pilot air PA1 is released, the pilot check valve 66 is closed.

As described above, by configuring the chuck 1 and the separator 3 to operate in order by using the air (air pressure) supplied from the common air source 61 as the driving source, it is possible to easily control the operation of the chuck 1 and the separator 3 such that the separator 3 performs the separation operation of the workpiece W2 in conjunction with the gripping operation of the workpiece W1 by the gripping claws 2.

Second Embodiment

Figure 5:
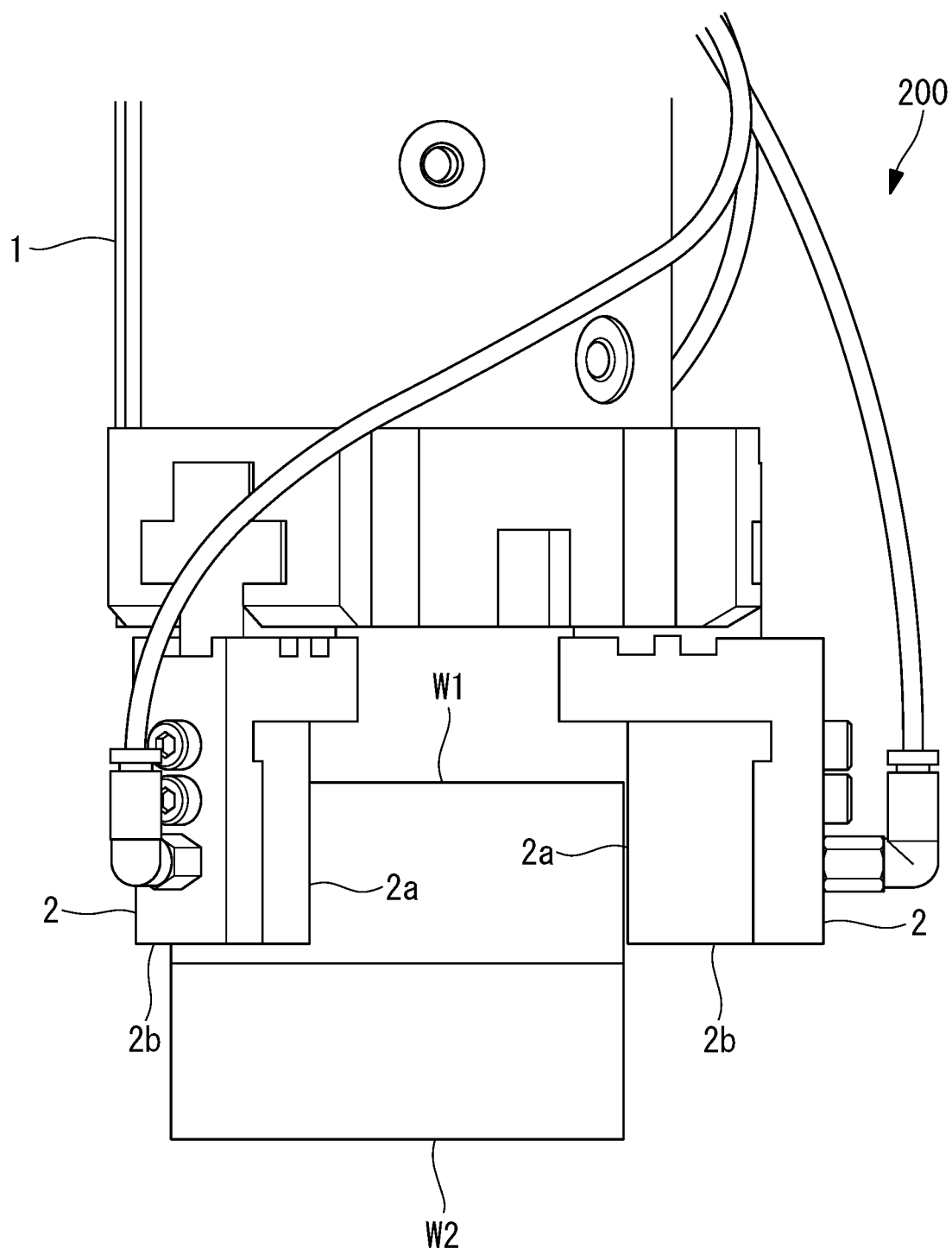
FIG. 5 is a partial external view of a workpiece picking device according to a second embodiment of the present invention.

Next, referring to FIGS. 5 and 6, a description is given of a workpiece picking device 200 according to a second embodiment of the present invention.

In this embodiment, a description is given of the configurations that are different from the configurations in the first embodiment, and as for the configurations that are common to the configurations of the first embodiment, the same reference numerals are given, and a description thereof is omitted.

As shown in FIG. 5 and FIG. 6A to 6D, the workpiece picking device 200 according to this embodiment includes the chuck 1 including the plurality of gripping claws 2, and a separator 31 built-in inside at least one of the gripping claws 2.

Although FIGS. 5 and 6 illustrate the workpieces W1, W2 . . . without the flange F, the workpiece picking device 200 of this embodiment is also applicable to the workpieces W1, W2 . . . with the flange F as in the first embodiment.

As shown in FIG. 6A to 6D, the separator 31 includes a pressing part 41, an air cylinder (driving part) 51 that moves the pressing part 41 obliquely up and down with respect to the vertical direction, and the air circuit 6 connected to the air cylinder 51.

The pressing part 41 is formed by an elastic body that is elastically deformed when having contact with the side surface of the workpiece W2. The pressing part 41 is arranged inside the gripping claw 2 at the position outwardly spaced from the chuck surface 2a (the opposite side of the central axis X), so as to be able to project obliquely downward from the bottom surface 2b of the gripping claw 2 toward the central axis X.

The air cylinder 51 pushes out the pressing part 41 obliquely downward toward the central axis X when the compressed air (air) A is supplied from the air circuit 6, and raises the pressing part 41 obliquely upward when the air A is discharged via the air circuit 6.

Next, a description is given of the operation of the workpiece picking device 200 configured as described above.

Figure 6A:
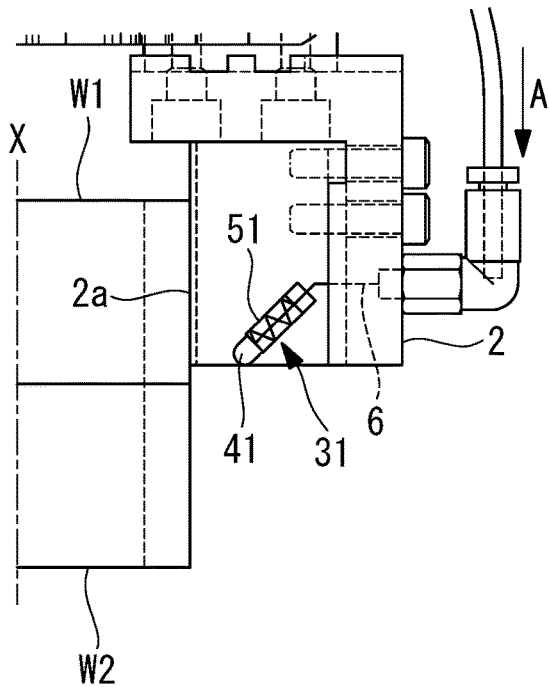
FIG. 6A is a diagram of the internal configuration of a gripping claw and the operation of the workpiece picking device of FIG. 5 illustrating the state where the topmost workpiece is gripped by the gripping claws.

When the operation of the workpiece picking device 200 is started, the chuck 1 is lowered to the position where the three gripping claws 2 surround the topmost workpiece W1, and subsequently, as shown in FIG. 6A, the side surface of the topmost workpiece W1 is gripped by the gripping claws 2 by closing the three gripping claws 2.

Figure 6B:
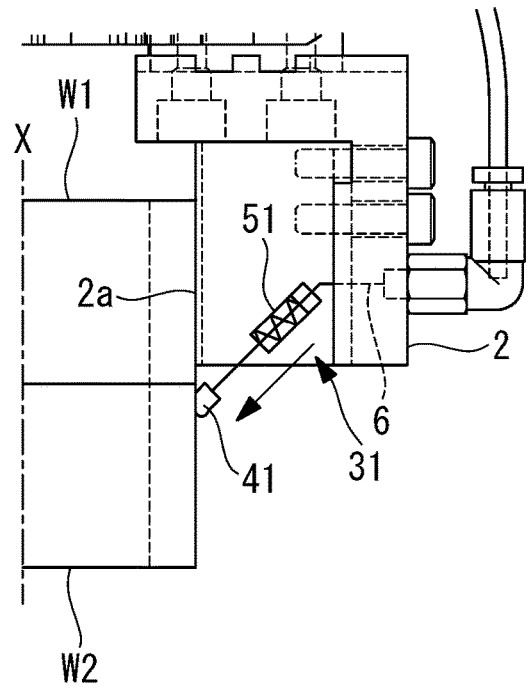
FIG. 6B is a diagram of the internal configuration of a gripping claw and the operation of the workpiece picking device of FIG. 5 illustrating the state where a pressing part is pushed out obliquely downward.

Next, as shown in FIG. 6B, the air A is supplied to air cylinder 51 from the air circuit 6, and the air cylinder 51 pushes out the pressing part 41 obliquely downward. At this moment, when the workpiece W2 is adhering to the bottom of the workpiece W1, the pressing part 41 is pressed against the side surface of the workpiece W2 while being elastically deformed.

Figure 6C:
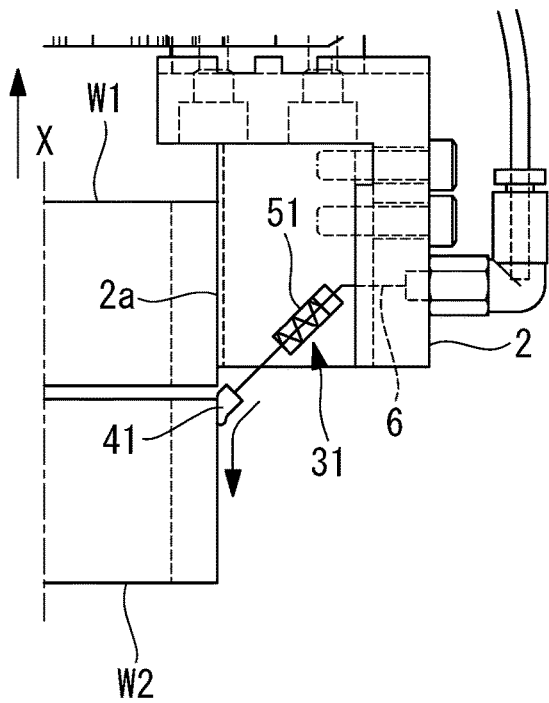
FIG. 6C is a diagram of the internal configuration of a gripping claw and the operation of the workpiece picking device of FIG. 5 illustrating the state where a chuck is raised.

Next, as shown in FIG. 6C, the chuck 1 is raised, and the workpiece W1 is also raised together with the chuck 1. In the process in which the workpiece W1 is raised, the pressing part 41 continues to be pressed against the side surface of the workpiece W2 obliquely downward by the air cylinder 51 while being further elastically deformed. Accordingly, the workpiece W2 is reliably separated from the workpiece W1 that is raised, and only the workpiece W1 is lifted.

Figure 6D:
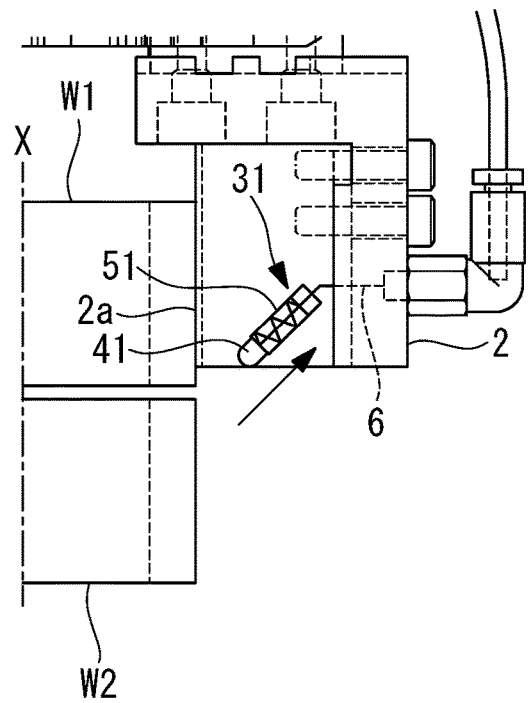
FIG. 6D is a diagram of the internal configuration of a gripping claw and the operation of the workpiece picking device of FIG. 5 illustrating the state where the pressing part is raised.

Next, as shown in FIG. 6D, the air A is discharged from the air cylinder 51 via the air circuit 6, and the air cylinder 51 raises the pressing part 41 to the inside of the gripping claw 2.

As described above, according to this embodiment, the workpiece picking device 200 is configured such that when the chuck 1 lifts the topmost workpiece W1, the second workpiece W2 is pressed downward by the pressing part 41. Therefore, in the process of lifting the workpiece W1, the workpiece W2 adhering to the bottom of the workpiece W1 can be reliably separated from the workpiece W1, and only the workpiece W1 can be picked up. Additionally, since the separator 31 is provided inside the gripping claw 2, compared with the case where the separator separated from the chuck 1 is provided outside the chuck 1, it is possible to reduce the size and cost of the whole device. Further, in the task of picking up the workpiece W1, the process added with the addition of the separator 31 is only a process of pushing out the pressing part 41. Thus, there is almost no extension of the take out time.

Also in this embodiment, the air circuit 6 of FIG. 4 may be adopted, and the separator 31 may perform the separation operation of the workpiece W2 in conjunction with the gripping operation of the workpiece W1 by the gripping claws 2.

Third Embodiment

Next, referring to FIGS. 7 to 10, a description is given of a workpiece picking device 300 according to a third embodiment of the present invention.

In this embodiment, a description is given of the configurations that are different from the configurations in the first embodiment, and as for the configurations that are common to the configurations of the first embodiment, the same reference numerals are given, and a description thereof is omitted.

As shown in FIG. 7 and FIG. 8A to 8D, the workpiece picking device 300 according to this embodiment includes the chuck 1 including the plurality of gripping claws 2, and a separator 32 built-in inside at least one of the gripping claws 2.

Figure 7:
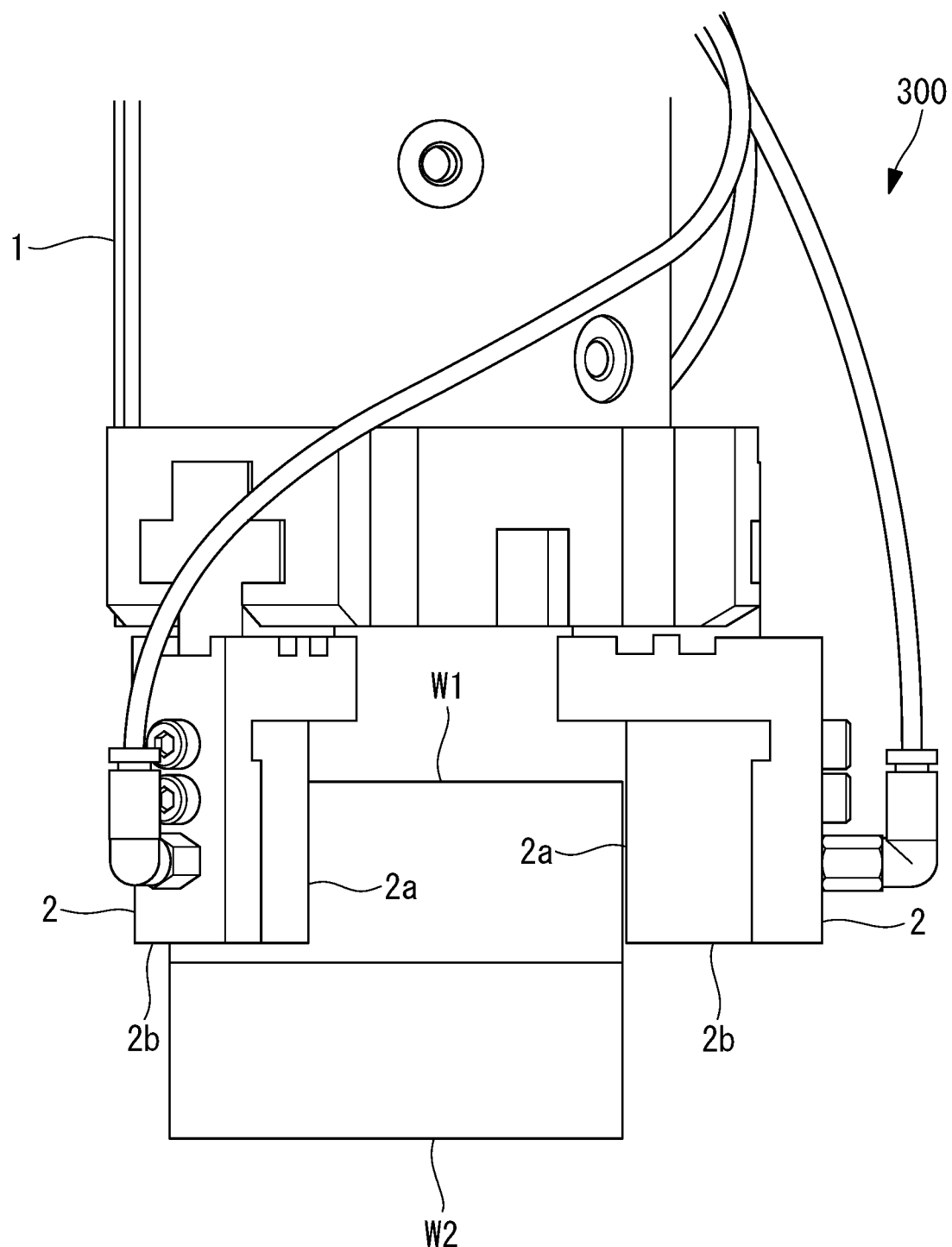
FIG. 7 is a partial external view of the workpiece picking device according to a third embodiment of the present invention.

Although FIG. 7 and FIG. 8 illustrate the workpieces W1, W2 . . . without the flange F, the workpiece picking device 300 of this embodiment is also applicable to the workpieces W1, W2 . . . with the flange F as in the first embodiment.

As shown in FIG. 8A to 8D, the separator 32 includes a pressing part 42, a swing cylinder (air cylinder, driving part) 52 that moves the pressing part 42 up and down in the vertical direction while rotating the pressing part 42 about a rotation axis Y in the vertical direction, and the air circuit 6 connected to the swing cylinder 52.

The pressing part 42 is formed by an elastic body that is elastically deformed when having contact with the side surface of the workpiece W2. The pressing part 42 is arranged inside the gripping claw 2 at the position outwardly spaced from the chuck surface 2a (the opposite side of the central axis X), so as to be able to project vertically downward from the bottom surface 2b of the gripping claw 2.

The swing cylinder 52 pushes out the pressing part 42 vertically downward when the compressed air (air) A is supplied from the air circuit 6, and raises the pressing part 42 vertically upward when the air A is discharged via the air circuit 6. At this moment, the swing cylinder 52 is configured to make the pressing part 42 perform translation in the lower end or in the part upper than the vicinity of the lower end of the topmost workpiece W1 that is gripped by the gripping claws 2, and to rotate the pressing part 42 about the rotation axis Y in the lower end or in the part lower than the vicinity of the lower end of the workpiece W1.

Here, the pressing part 42 consists of a plate-like member arranged horizontally, and a side surface 42a facing the horizontal direction of the pressing part 42 has a shape in which the horizontal distance from the rotation axis Y to the side surface 42a gradually changes in the circumferential direction of the rotation axis Y. The maximum distance from the rotation axis Y to the side surface 42a of the pressing part 42 is larger than the horizontal distance from the rotation axis Y to the side surface of workpiece W2 in the state where the workpiece W1 is gripped by the gripping claws 2, and the minimum distance from the rotation axis Y to the side surface 42a of the pressing part 42 is smaller than the horizontal distance from the rotation axis Y to the side surface of the workpiece W2 in the state where the workpiece W1 is gripped by the gripping claws 2. For example, as shown in FIG. 9A to 9D, the pressing part 42 has an elliptical shape when viewed in the vertical direction, and is attached to the swing cylinder 52 such that the rotation axis Y is decentered with respect to the center of the pressing part 42.

Therefore, the distance between the side surface 42a of the pressing part 42 and the side surface of the workpiece W2 is gradually changed according to the angle of rotation of the pressing part 42 about the rotation axis Y, and the pressing part 42 is pressed against the side surface of the workpiece W2 while being elastically deformed as the pressing part 42 is lowered.

Next, a description is given of the operation of the workpiece picking device 300 configured as described above.

Figure 8A:
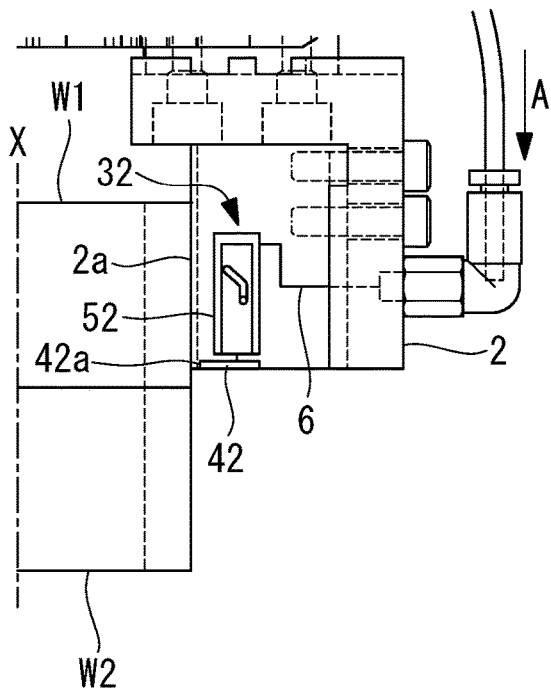
FIG. 8A is a diagram of the internal configuration of a gripping claw and the operation of the workpiece picking device of FIG. 7 illustrating the state where the topmost workpiece is gripped by the gripping claws.
Figure 8B:
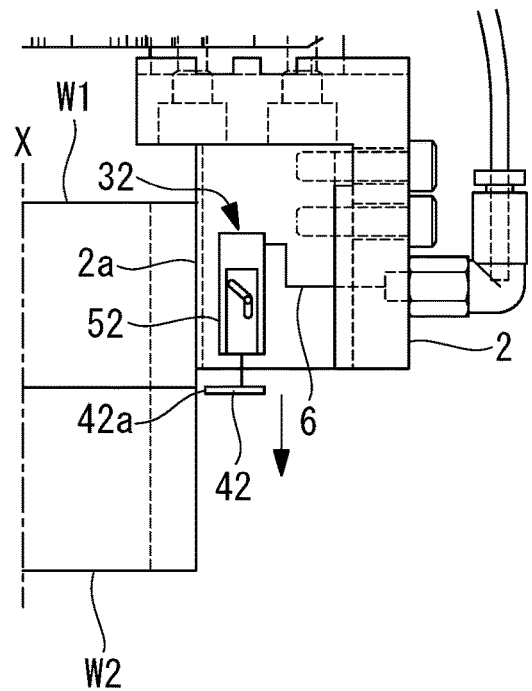
FIG. 8B is a diagram of the internal configuration of a gripping claw and the operation of the workpiece picking device of FIG. 7 illustrating the state where a pressing part is pushed out to a middle position.

When the operation of the workpiece picking device 300 is started, the chuck 1 is lowered to the position where the three gripping claws 2 surround the topmost workpiece W1, and subsequently, as shown in FIG. 8A, the side surface of the topmost workpiece W1 is gripped by the gripping claws 2 by closing the three gripping claws 2.

Figure 8C:
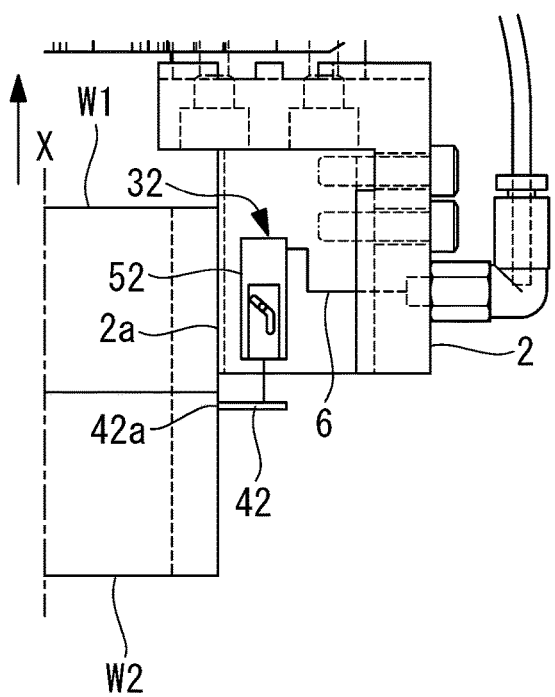
FIG. 8C is a diagram of the internal configuration of a gripping claw and the operation of the workpiece picking device of FIG. 7 illustrating the state where the pressing part is pressed against the second workpiece.
Figure 9A:
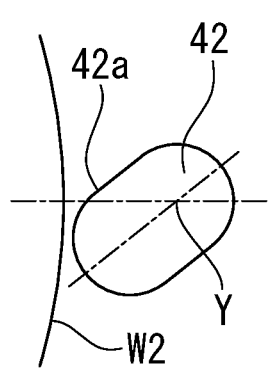
FIG. 9A is a top view of the pressing part seen in the vertical direction illustrating the direction of the rotation axis of the pressing part in FIG. 8A.
Figure 9B:
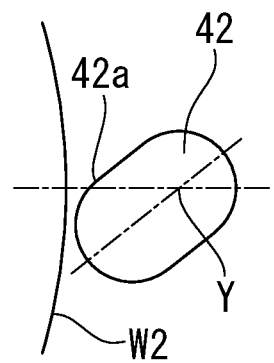
FIG. 9B is the top view of the pressing part seen in the vertical direction illustrating the direction of the rotation axis of the pressing part in FIG. 8B.
Figure 9C:
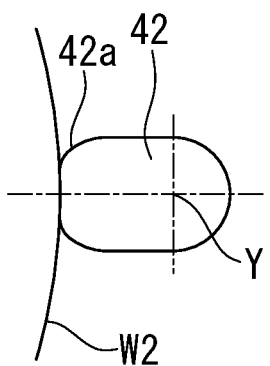
FIG. 9C is the top view of the pressing part seen in the vertical direction illustrating the direction of the rotation axis of the pressing part in FIG. 8C.

Next, as shown in FIGS. 8A and 8C, the air A is supplied to the swing cylinder 52 from the air circuit 6, and the swing cylinder 52 pushes out the pressing part 42 vertically downward. At this moment, as shown in FIGS. 9A and 9B, the pressing part 42 is lowered to the lower end or the vicinity of the lower end of the workpiece W1 without rotating, and thereafter, as shown in FIG. 9C, the pressing part 42 is rotated about the rotation axis Y. Accordingly, when the workpiece W2 is adhering to the bottom of the workpiece W1, as shown in FIG. 8C and FIG. 9C, the pressing part 42 is pressed against the side surface of the workpiece W2 while being elastically deformed.

Next, as shown in FIG. 8C, the chuck 1 is raised, and the workpiece W1 is also raised together with the chuck 1. In the process in which the workpiece W1 is raised, the pressing part 42 continues to be pressed against the side surface of the workpiece W2 obliquely downward by the swing cylinder 52. Accordingly, the workpiece W2 is reliably separated from the workpiece W1 that is raised, and only the workpiece W1 is lifted.

Figure 8D:
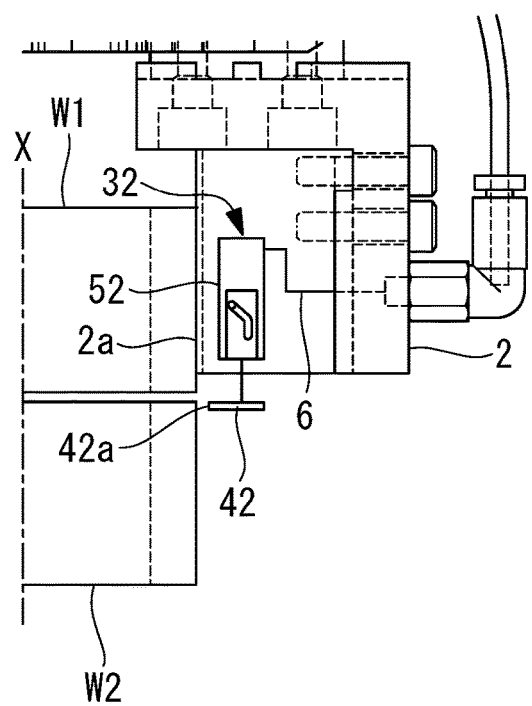
FIG. 8D is a diagram of the internal configuration of a gripping claw and the operation of the workpiece picking device of FIG. 7 illustrating the state where the chuck is raised.
Figure 9D:
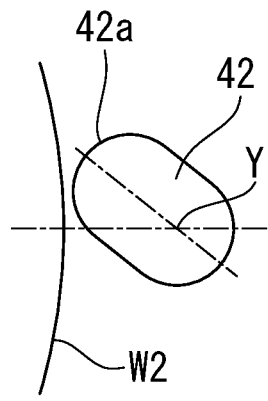
FIG. 9D is the top view of the pressing part seen in the vertical direction illustrating the direction of the rotation axis of the pressing part in FIG. 8D.

Next, as shown in FIG. 8D and FIG. 9D, the pressing down of the workpiece W2 by the pressing part 42 is canceled by further rotating the pressing part 42 by the swing cylinder 52.

As described above, according to this embodiment, the workpiece picking device 300 is configured such that when the chuck 1 lifts the topmost workpiece W1, the second workpiece W2 is pressed downward by the pressing part 42. Therefore, in the process of lifting the workpiece W1, the workpiece W2 adhering to the bottom of the workpiece W1 can be reliably separated from the workpiece W1, and only the workpiece W1 can be picked up. Additionally, since the separator 32 is provided inside the gripping claw 2, compared with the case where the separator separate from the chuck 1 is provided outside the chuck 1, it is possible to reduce the size and cost of the whole device. Further, in the task of picking up the workpiece W1, the process added with the addition of the separator 32 is only a process of pushing out the pressing part 42. Thus, there is almost no extension of the take out time.

Also in this embodiment, the air circuit 6 of FIG. 4 may be adopted, and the separator 32 may perform the separation operation of the workpiece W2 in conjunction with the gripping operation of the workpiece W1 by the gripping claws 2.

Figure 10A:
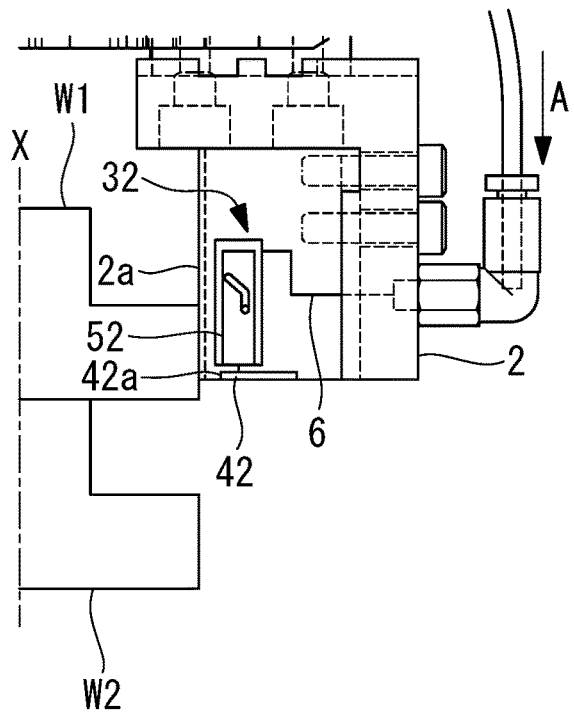
FIG. 10A is a diagram of a modification of the operation of the workpiece picking device of FIG. 8 illustrating the state where the topmost workpiece is gripped by the gripping claws.
Figure 10B:
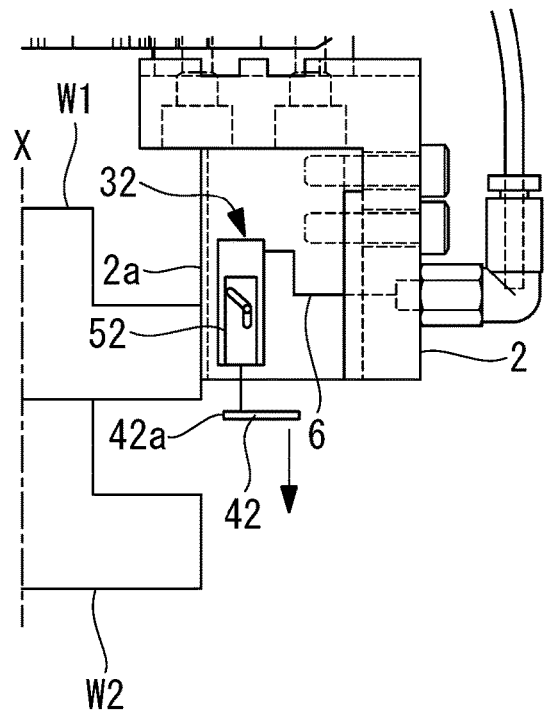
FIG. 10B is a diagram of a modification of the operation of the workpiece picking device of FIG. 8 illustrating the state where a pressing part is pushed out to a middle position.
Figure 10C:
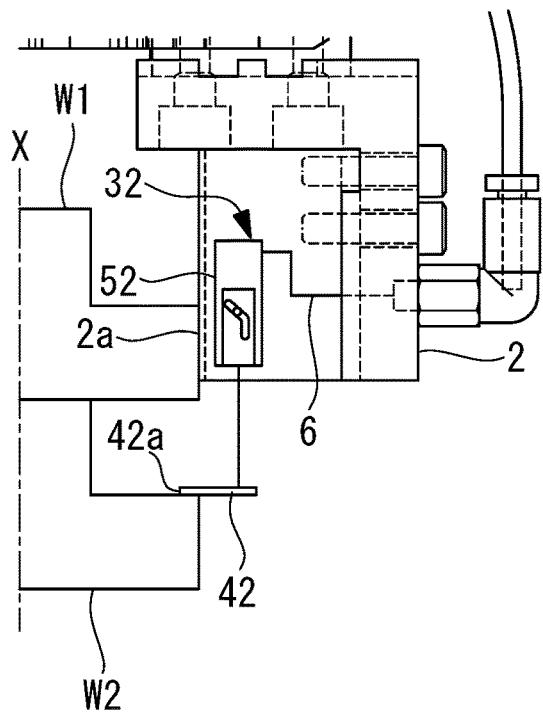
FIG. 10C is a diagram of a modification of the operation of the workpiece picking device of FIG. 8 illustrating the state where the pressing part is pressed against the second workpiece.
Figure 11A:
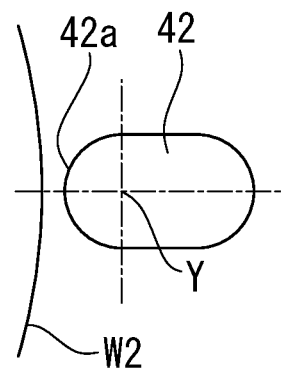
FIG. 11A is a top view of the pressing part seen in the vertical direction illustrating the direction of the rotation axis of the pressing part in FIG. 10A.

As shown in FIGS. 10 and 11, the workpiece picking device 300 of this embodiment can be preferably applied to the workpieces W1, W2 . . . with a stepped side surface, or the workpieces W1, W2 . . . with the flange F in the lower end.

The workpieces W1, W2 . . . of FIGS. 10 and 11 include a small diameter portion on the upper end side, and a large diameter portion (or the flange F) whose diameter is larger than the small diameter portion on the lower end side. In the case of such workpieces W1, W2 . . . , as shown in FIG. 10A, the side surface of the large diameter portion of the topmost workpiece W1 is gripped by the three gripping claws 2.

Figure 11B:
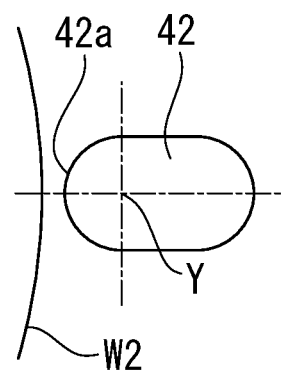
FIG. 11B is the top view of the pressing part seen in the vertical direction illustrating the direction of the rotation axis of the pressing part in FIG. 10B.

Next, when the pressing part 42 is pushed out by the swing cylinder 52 vertically downward, as shown in FIG. 10B and FIG. 11B, the pressing part 42 is lowered to the lower end or the vicinity of the lower end of the workpiece W1 without rotating, and thereafter, as shown in FIG. 10C, the pressing part 42 is rotated about the rotation axis Y.

Figure 11C:
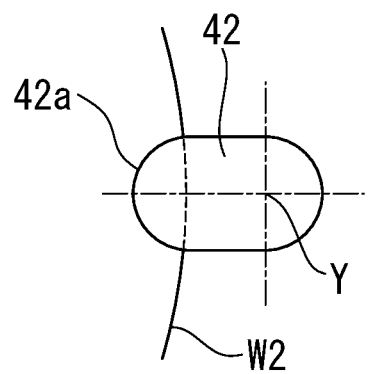
FIG. 11C is the top view of the pressing part seen in the vertical direction illustrating the direction of the rotation axis of the pressing part in FIG. 10C.

Accordingly, when the workpiece W2 is adhering to the bottom of the workpiece W1, as shown in FIG. 10C and FIG. 11C, the pressing part 42 is pressed against the large diameter portion (or the flange F) of the workpiece W2 vertically downward, and the workpiece W2 can be reliably separated from the workpiece W1 in the process of lifting the workpiece W1.

Fourth Embodiment

Figure 12:
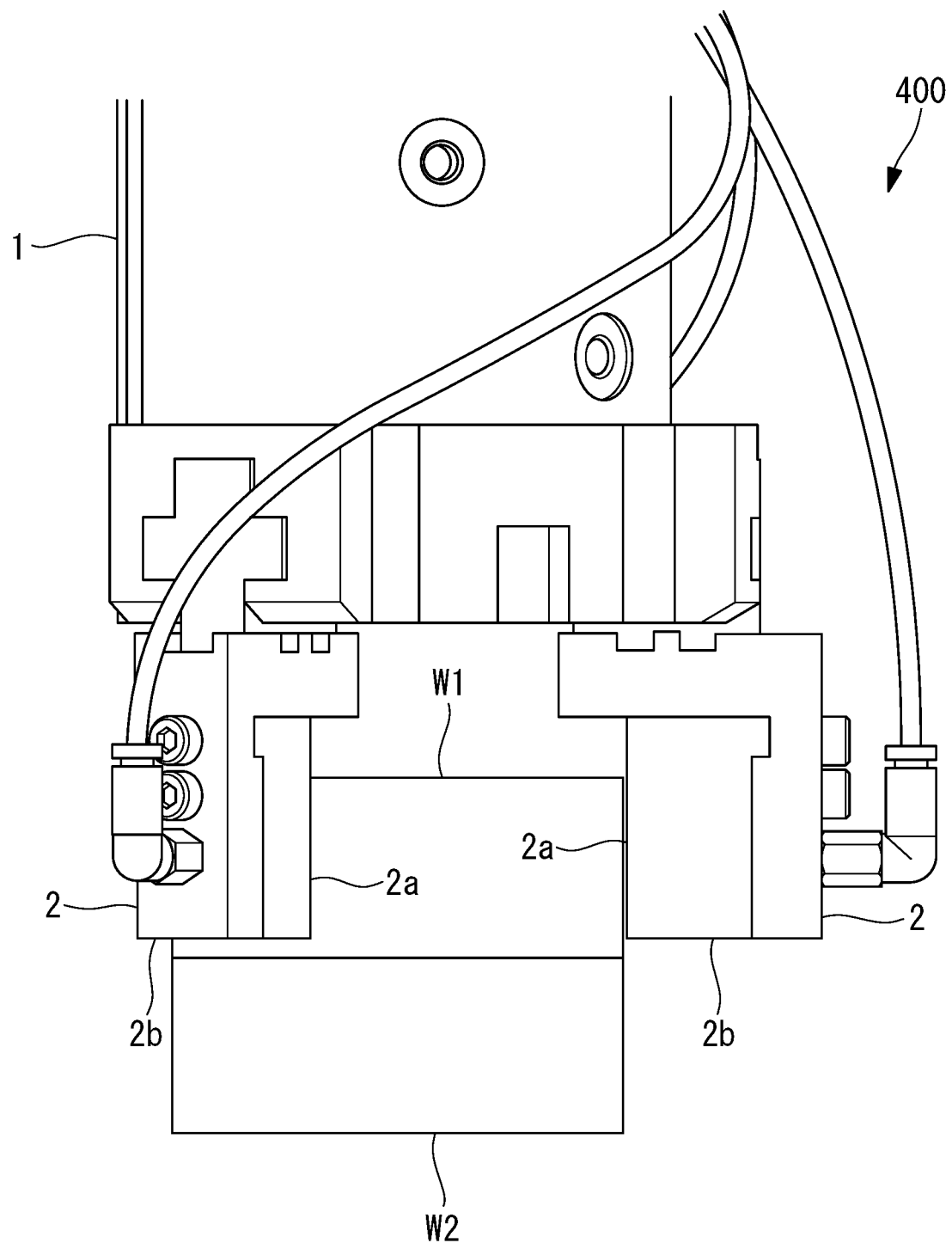
FIG. 12 is a partial external view of the workpiece picking device according to a fourth embodiment of the present invention.

Next, referring to FIGS. 12 and 13, a description is given of a workpiece picking device 400 according to a fourth embodiment of the present invention.

In this embodiment, a description is given of the configurations that are different from the configurations in the first embodiment, and as for the configurations that are common to the configurations of the first embodiment, the same reference numerals are given, and a description thereof is omitted.

As shown in FIG. 12 and FIG. 13A to 13D, the workpiece picking device 400 according to this embodiment includes the chuck 1 including the plurality of gripping claws 2, and a separator 33 built-in inside at least one of the gripping claws 2.

Although FIGS. 12 and 13 illustrate the workpieces W1, W2 . . . without the flange F, the workpiece picking device 400 of this embodiment is also applicable to the workpieces W1, W2 . . . with the flange F as in the first embodiment.

As shown in FIG. 13A to 13D, the separator 33 includes a pressing part 43, an air cylinder (driving part) 53 that moves the pressing part 43 obliquely up and down with respect to the vertical direction, and the air circuit 6 connected to the air cylinder 53.

The pressing part 43 consists of a spherical member, and is arranged inside the gripping claw 2 at the position outwardly spaced from the chuck surface 2a (the opposite side of the central axis X), so as to be able to project obliquely downward from the bottom surface 2b of the gripping claw 2 toward the central axis X.

The air cylinder 53 pushes out the pressing part 43 obliquely downward toward the central axis X when the compressed air (air) A is supplied from the air circuit 6, and raises the pressing part 43 obliquely upward when the air A is discharged via the air circuit 6. Additionally, the air cylinder 53 is provided so as to be able to swing within a vertical plane about a swing axis in the horizontal direction, and is supported in a posture in which the pressing part 43 is oriented obliquely downward toward the central axis X by a spring 7 that biases the air cylinder 53 upward.

Next, a description is given of the operation of the workpiece picking device 400 configured as described above.

Figure 13A:
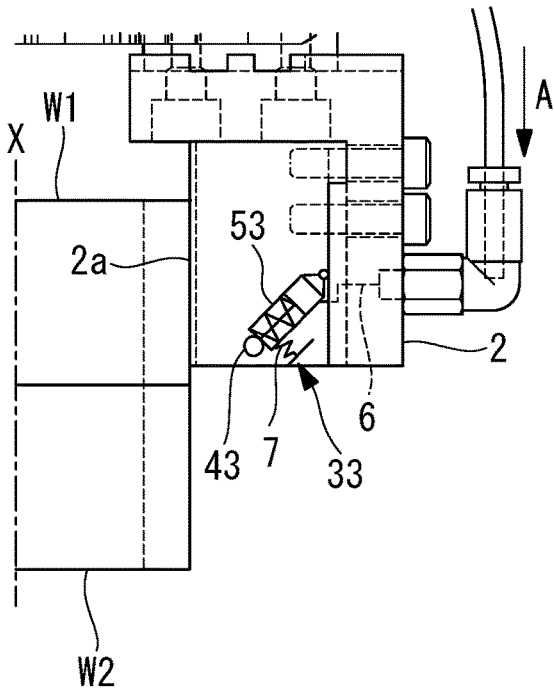
FIG. 13A is a diagram of the internal configuration of the gripping claw and the operation of the workpiece picking device of FIG. 12 illustrating the state where the topmost workpiece is gripped by the gripping claws.

When the operation of the workpiece picking device 400 is started, the chuck 1 is lowered to the position where the three gripping claws 2 surround the topmost workpiece W1, and subsequently, as shown in FIG. 13A, the side surface of the topmost workpiece W1 is gripped by the gripping claws 2 by closing the three gripping claws 2.

Figure 13B:
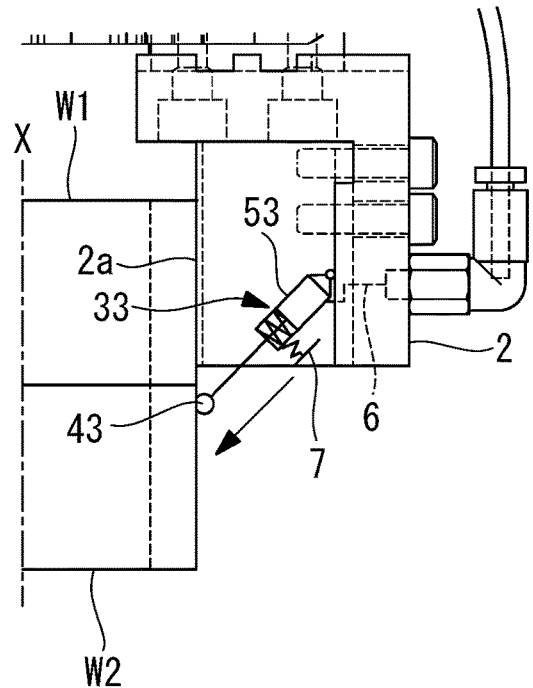
FIG. 13B is a diagram of the internal configuration of the gripping claw and the operation of the workpiece picking device of FIG. 12 illustrating the state where a pressing part is pushed out obliquely downward.

Next, as shown in FIG. 13B, the air A is supplied to the air cylinder 53 from the air circuit 6, and the air cylinder 53 pushes out the pressing part 43 obliquely downward. At this moment, when the workpiece W2 is adhering to the bottom of the workpiece W1, the pressing part 43 is pressed against the side surface of the workpiece W2.

Figure 13C:
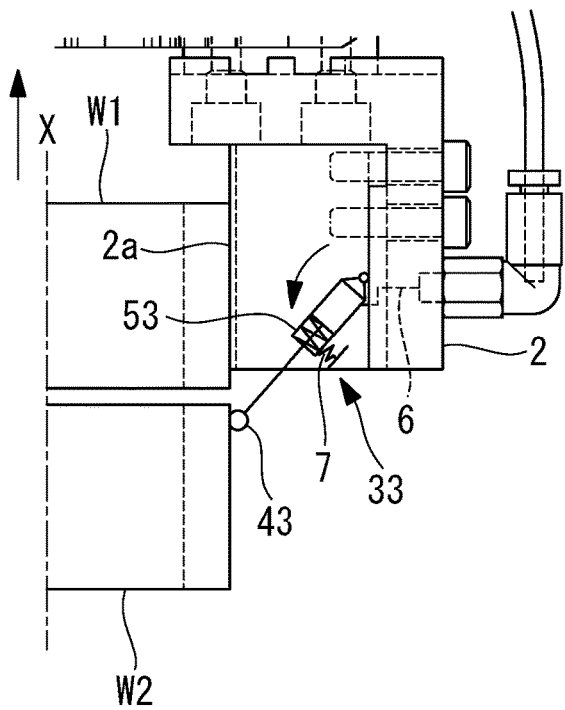
FIG. 13C is a diagram of the internal configuration of the gripping claw and the operation of the workpiece picking device of FIG. 12 illustrating the state where the chuck is raised.

Next, as shown in FIG. 13C, the chuck 1 is raised, and the workpiece W1 is also raised together with the chuck 1. In the process in which the workpiece W1 is raised, when the air cylinder 53 swings downward about a swing axis while pushing out the pressing part 43 obliquely downward (counterclockwise in FIG. 13C), the pressing part 43 continues to be pressed against the side surface of the workpiece W2 obliquely downward. Accordingly, the workpiece W2 is reliably separated from the workpiece W1 that is raised, and only the workpiece W1 is lifted.

Figure 13D:
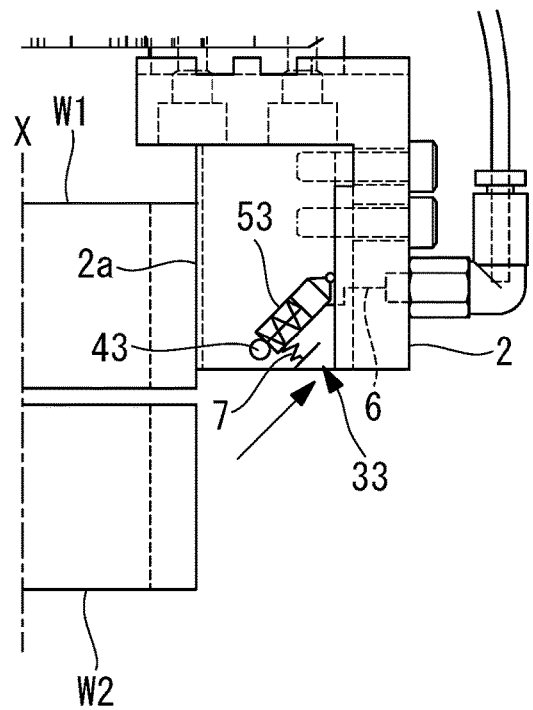
FIG. 13D is a diagram of the internal configuration of the gripping claw and the operation of the workpiece picking device of FIG. 12 illustrating the state where the pressing part is raised.

Next, as shown in FIG. 13D, the air A is discharged from the air cylinder 53 via the air circuit 6, and the air cylinder 53 raises the pressing part 43 to the inside of the gripping claws 2.

As described above, according to this embodiment, the workpiece picking device 400 is configured such that when the chuck 1 lifts the topmost workpiece W1, the second workpiece W2 is pressed downward by the pressing part 43. Therefore, in the process of lifting the workpiece W1, the workpiece W2 adhering to the bottom of the workpiece W1 can be reliably separated from the workpiece W1, and only the workpiece W1 can be picked up. Additionally, since the separator 33 is provided inside the gripping claw 2, compared with the case where the separator separate from the chuck 1 is provided outside the chuck 1, it is possible to reduce the size and cost of the whole device. Further, in the task of picking up the workpiece W1, the process added with the addition of the separator 33 is only a process of pushing out the pressing part 43. Thus, there is almost no extension of the take out time.

Also in this embodiment, the air circuit 6 of FIG. 4 may be adopted, and the separator 33 may perform the separation operation of the workpiece W2 in conjunction with the gripping operation of the workpiece W1 by the gripping claws 2.

In the first to fourth embodiments, the air cylinders 5, 51, 52 and 53, which are operated by using the air pressure as the source of power, are used as the driving parts. However, instead of this, the driving part, such as an electric actuator that is operated by using electric power as the source of power may be used.

From the above-described embodiments, the following aspects of the present disclosure are derived.

One aspect of the present disclosure is a workpiece picking device configured to pick up plate-like or pillar-shaped workpieces one at a time from a top of the workpieces stacked in a vertical direction, the workpiece picking device including: a chuck including a plurality of gripping claws arranged around a topmost workpiece, the plurality of gripping claws configured to grip a side surface of the topmost workpiece, the chuck being movable in a vertical direction; and a separator provided inside at least one of the gripping claws, the separator configured to separate the topmost workpiece gripped by the plurality of gripping claws from a second workpiece, the separator including: a pressing part configured to be projectable downwardly from the at least one of the gripping claws toward the second workpiece, and a driving part configured to press the pressing part against the second workpiece by moving the pressing part toward the second workpiece.

According to this aspect, among the plurality of workpieces arranged under the chuck, the topmost workpiece is gripped by the plurality of gripping claws, and in this state, the chuck is raised in the vertical direction. Thus, the workpieces can be picked up in order from the top.

In this case, the second workpiece is separated from the topmost workpiece gripped by the gripping claws by the operation of the separator.

That is, the pressing part projects from at least one of the gripping claws toward the second workpiece, and is pressed downward against the second workpiece by the operation of the driving part. Subsequently, the topmost workpiece is raised by raising the chuck in the state where the second workpiece is pressed downwardly by the pressing part. Thus, the second workpiece is separated from the topmost workpiece.

In this way, by providing the separator inside the gripping claw, it is possible to provide the separator without increasing the size of the whole device.

In the above aspect, the driving part may push out the pressing part vertically downward near the side surface of the topmost workpiece.

In the case of a workpiece with a flange projecting further than the side surface in a horizontal direction in the upper end, the flange of the second workpiece can be pressed vertically downward by the pressing part that is pushed out from at least one of the gripping claws vertically downward near the side surface of the topmost workpiece.

In the above aspect, the driving part may push out the pressing part obliquely downward.

In this way, the side surface of the second workpiece can be pressed downward by the pressing part that is pushed out from at least one of the gripping claws obliquely downward toward the second workpiece.

In the above aspect, the driving part may push out the pressing part vertically downward while rotating the pressing part about a rotation axis in the vertical direction, and a side surface facing a horizontal direction of the pressing part may have a shape in which a horizontal distance from the rotation axis gradually changes in a circumferential direction of the rotation axis.

The horizontal interval between the pressing part pushed out from at least one of the gripping claws vertically downward and the second workpiece changes with the rotation of the pressing part. Accordingly, the second workpiece can be pressed vertically downward by pushing out the pressing part to the position where the pressing part contacts the second workpiece, and the second workpiece can be released from the pressing by the pressing part by further pushing out the pressing part.

In the above aspect, the pressing part may consist of an elastic body that is elastically deformed when having contact with the side surface of the second workpiece.

After the pressing part is elastically deformed by being pressed against the side surface of the second workpiece, also in the process in which the topmost workpiece is raised when the chuck is raised, the close contact between the pressing part and the side surface of the workpiece is maintained by the deformation of the pressing part. Thus, the pressing of the side surface of the second workpiece by the pressing part is maintained. Therefore, even after the raising of the topmost workpiece is started, it is possible to stably continue pressing the second workpiece downward.

In the above aspect, the driving part may be configured to be swingable in a vertical plane.

In this way, the driving part rocks in the direction toward the pressing part in the process in which the topmost workpiece is raised when the chuck is raised in the state where the pressing part is pressed against the side surface of the second workpiece. Thus, the pressing of the side surface of the second workpiece by the pressing part is maintained. Therefore, even after the raising of the topmost workpiece is started, it is possible to continue pressing the second workpiece downward.

In the above aspect, the driving part may be an air cylinder.

Therefore, it is possible to simplify the configurations and control of the driving part and its peripheral components by using the air cylinder driven by air pressure as the driving part.

In the above aspect, an arm that can move the chuck three-dimensionally between an upper side of the stacked workpieces and an upper side of a predetermined transfer destination may further be provided.

In this way, the workpiece picking device can be used as a transfer apparatus that transfers workpieces to the predetermined transfer destination.

In the above aspect, the chuck and the separator may be operated by using air pressure as a driving source, and a single air source to which the chuck and the separator are connected in parallel, the single air source configured to output the air pressure toward the chuck and the separator simultaneously, and a delay valve provided between the air source and the separator, the delay valve configured to delay transfer of the air pressure may further be provided.

The air pressure output from the single air source is supplied to the chuck, and thereafter, the air pressure is also supplied to the separator with a delay by the operation of the delay valve. Therefore, after the chuck is operated and the topmost workpiece is gripped by the plurality of gripping claws, the driving part of the separator is operated and the pressing part is pushed out toward the second workpiece. Therefore, it is possible to operate the separator in conjunction with the gripping operation of the workpiece by the chuck.

According to the aforementioned aspects, the effect is achieved that the means for separating the topmost workpiece from the second workpiece can be mounted without increasing the size of the device.

REFERENCE SIGNS LIST 100, 200, 300, 400 workpiece picking device
1 chuck
2 gripping claw
2a chuck surface
2b bottom surface
3, 31, 32, 33 separator
4, 41, 42, 43 pressing part
5, 51, 53 air cylinder (driving part)
52 swing cylinder (air cylinder, driving part)
6 air circuit
7 spring
10 robot arm (arm)
A air (air pressure)
W1, W2 workpiece
F flange
X central axis
Y rotation axis

The invention claimed is:

1. A workpiece picking device configured to pick up plate-shaped or pillar-shaped workpieces one workpiece at a time from a top of the workpieces stacked in a vertical direction, the workpiece picking device comprising:
a chuck including a plurality of gripping claws arranged around a topmost workpiece, the plurality of gripping claws configured to grip a side surface of the topmost workpiece, the chuck being movable in a vertical direction;
an air cylinder provided inside at least one of the gripping claws; and
a pressing member which is moved by the air cylinder, the pressing member having a rectangular or circular shape,
wherein the pressing member is configured to be projectable downwardly from the at least one of the gripping claws toward the second workpiece, and
the air cylinder is configured to press the pressing member against the second workpiece by protruding the pressing member downwardly from the at least one of the gripping claws, and thereby the air cylinder separates the second workpiece from the topmost workpiece gripped by the gripping claws.

2. The workpiece picking device according to claim 1, wherein the air cylinder pushes out the pressing member vertically downward near the side surface of the topmost workpiece.

3. The workpiece picking device according to claim 1, wherein the air cylinder pushes out the pressing member obliquely downward.

4. The workpiece picking device according to claim 2, wherein the air cylinder pushes out the pressing member vertically downward while rotating the pressing member about a rotation axis in the vertical direction.

5. The workpiece picking device according to claim 3, wherein the pressing member comprises an elastic body that is elastically deformed when in contact with the side surface of the second workpiece.

6. The workpiece picking device according to claim 3, wherein the air cylinder is configured to be swingable in a vertical plane.

7. The workpiece picking device according to claim 1, further comprising an arm that moves the chuck three-dimensionally between an upper side of the stacked workpieces and an upper side of a predetermined transfer destination.

8. The workpiece picking device according to claim 1, wherein the chuck and the air cylinder are operated using air pressure as a driving source,
the workpiece picking device further comprising:
a single air source to which the chuck and the air cylinder are connected in parallel, the single air source configured to output the air pressure toward the chuck and the air cylinder simultaneously; and
a delay valve provided between the air source and the air cylinder, the delay valve configured to delay transfer of the air pressure.

9. A workpiece picking device configured to pick up plate-shaped or pillar-shaped workpieces one workpiece at a time from a top of the workpieces stacked in a vertical direction, the workpiece picking device comprising:
a chuck including a plurality of gripping claws arranged around a topmost workpiece, the plurality of gripping claws configured to grip a side surface of the topmost workpiece, the chuck being movable in a vertical direction;
an air cylinder provided inside at least one of the gripping claws; and
a pressing member, wherein one side of the pressing member is connected to the air cylinder and the pressing member is moved by the air cylinder, wherein the pressing member is configured to be projectable downwardly from the at least one of the gripping claws toward the second workpiece, and the air cylinder is configured to press the pressing member against the second workpiece by protruding the pressing member downwardly from the at least one of the gripping claws, and thereby the air cylinder separates the second workpiece from the topmost workpiece gripped by the gripping claws.

* * * * *